T. M. FINLEY.
AEROCRUISER.
APPLICATION FILED JUNE 29, 1917.
1,328,040.
Patented Jan. 13, 1920.
7 SHEETS—SHEET 4.
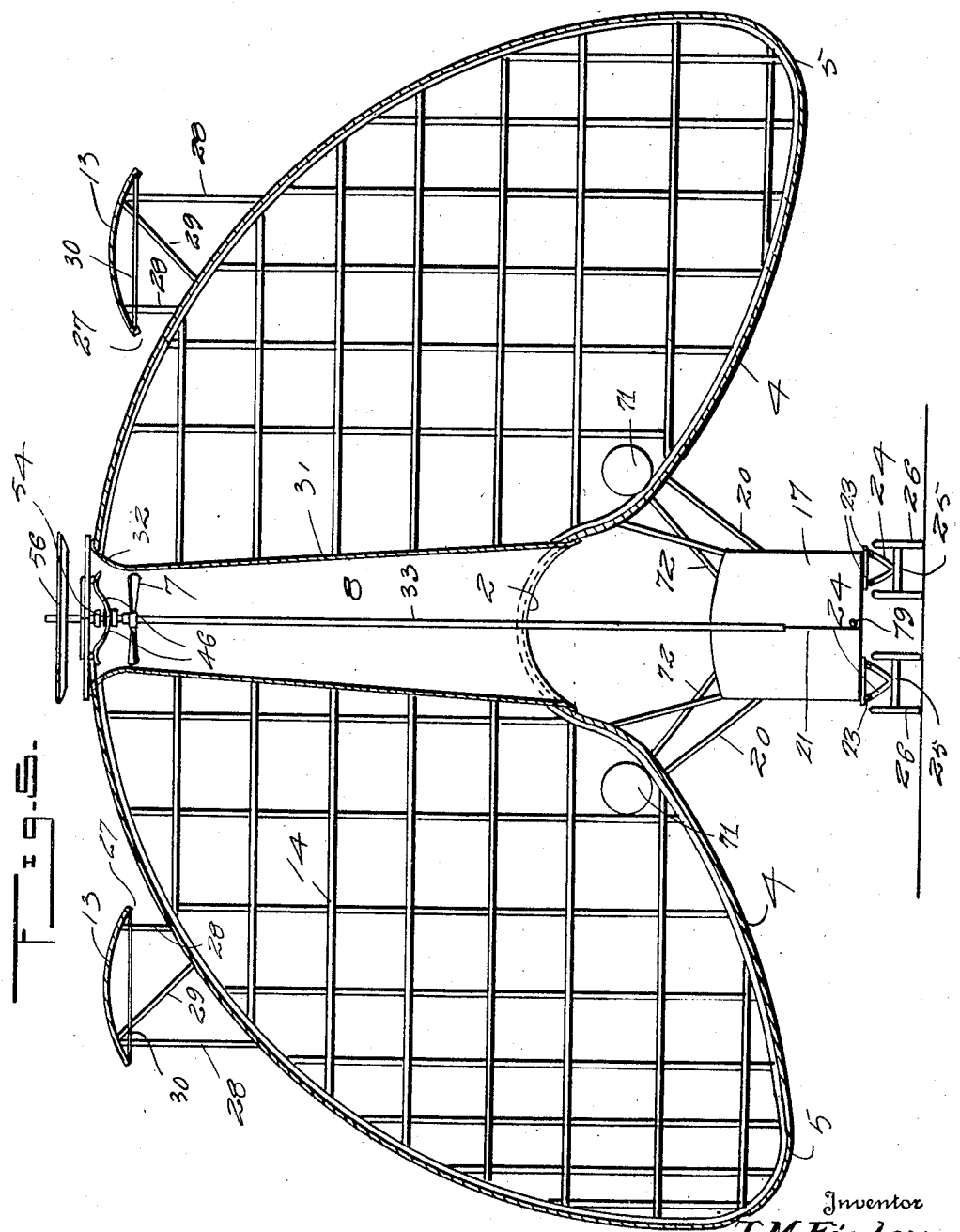

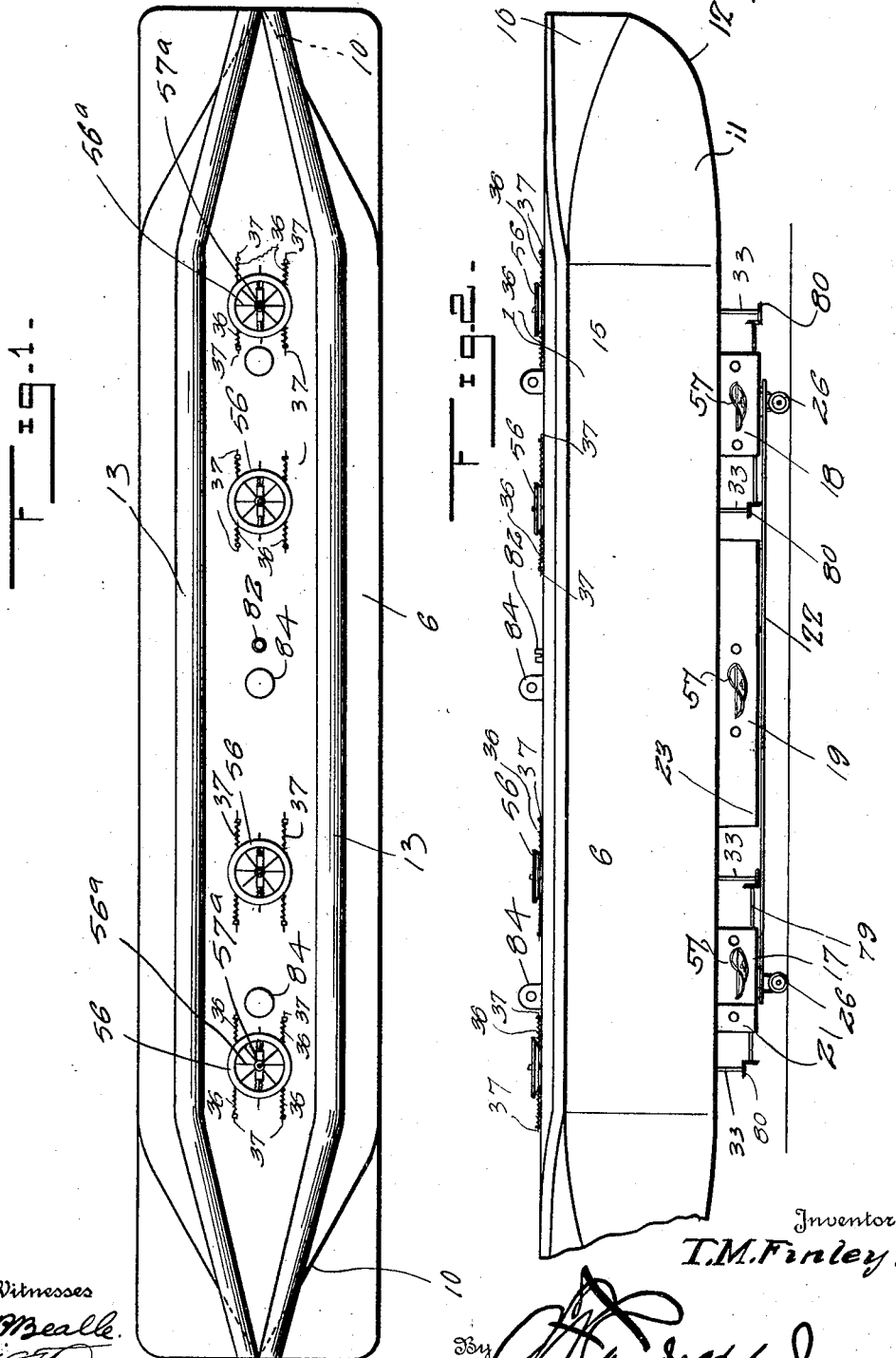

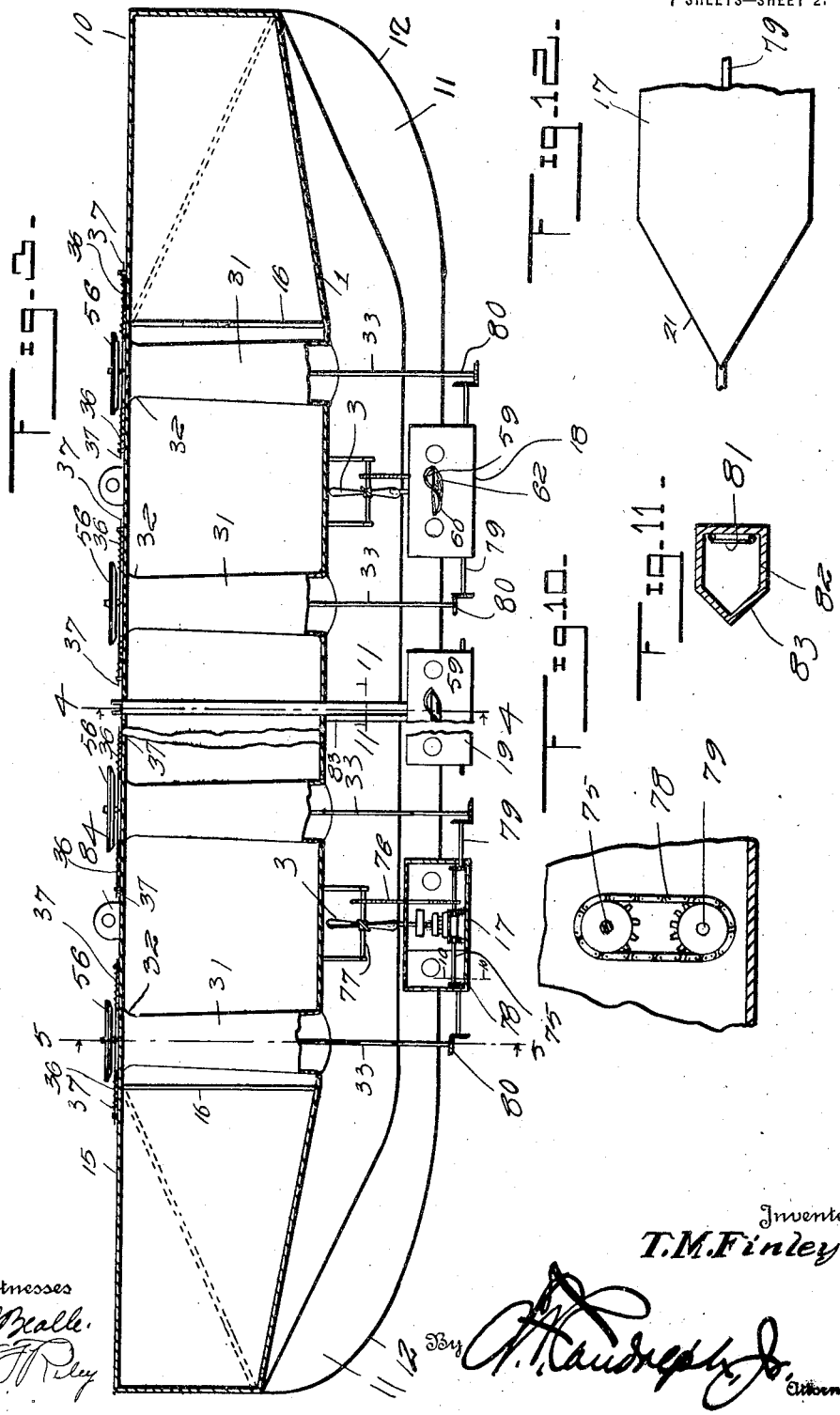

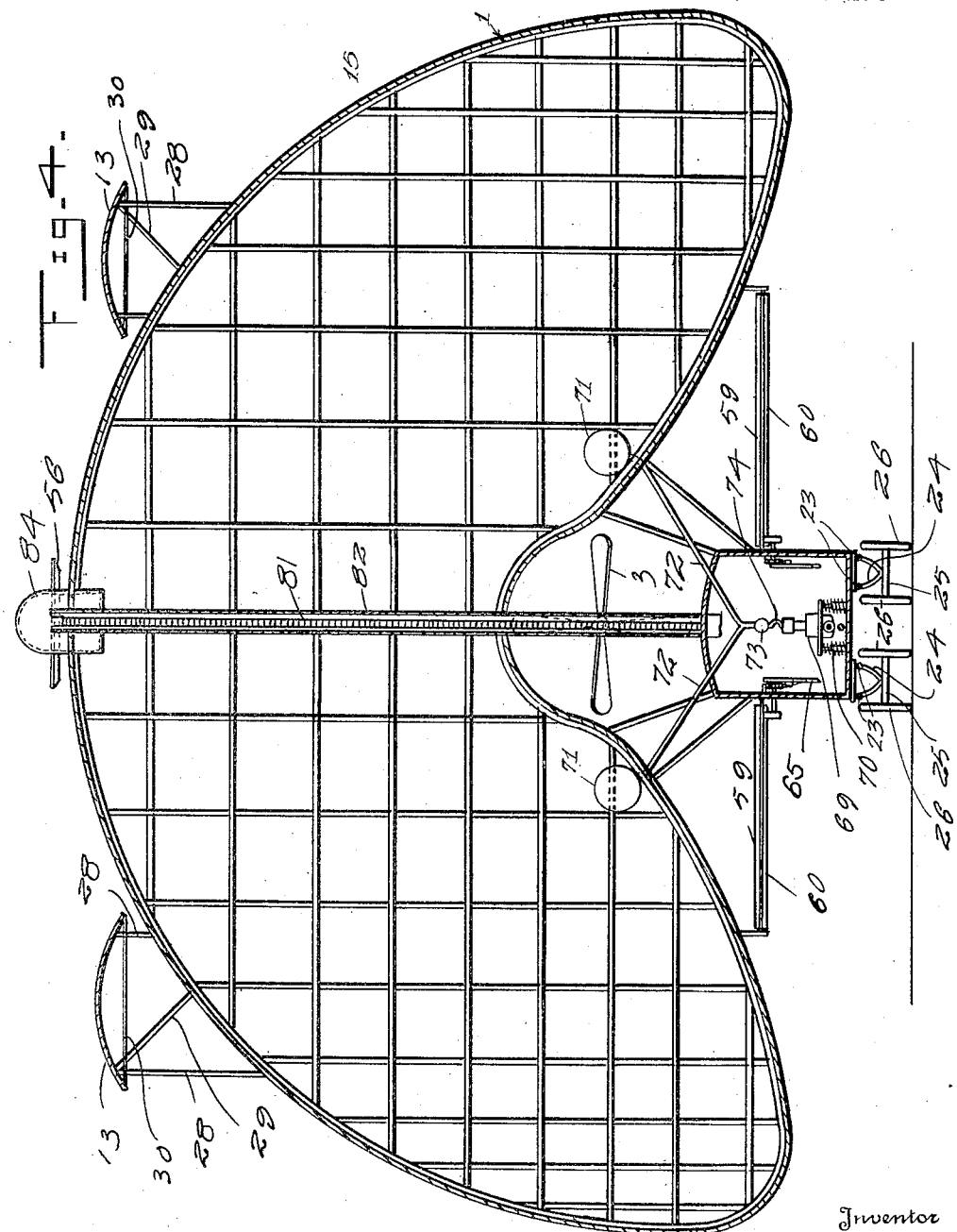

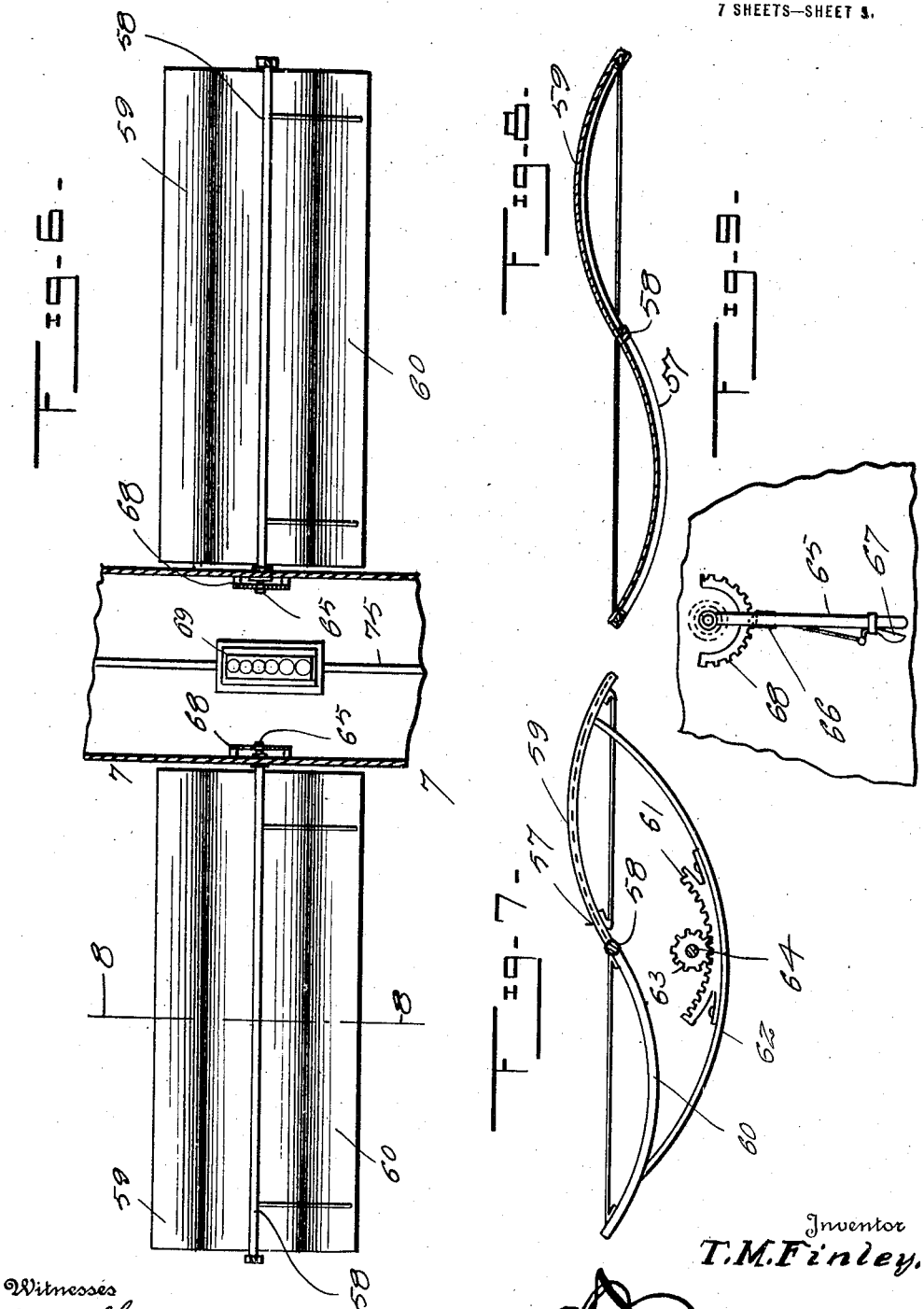

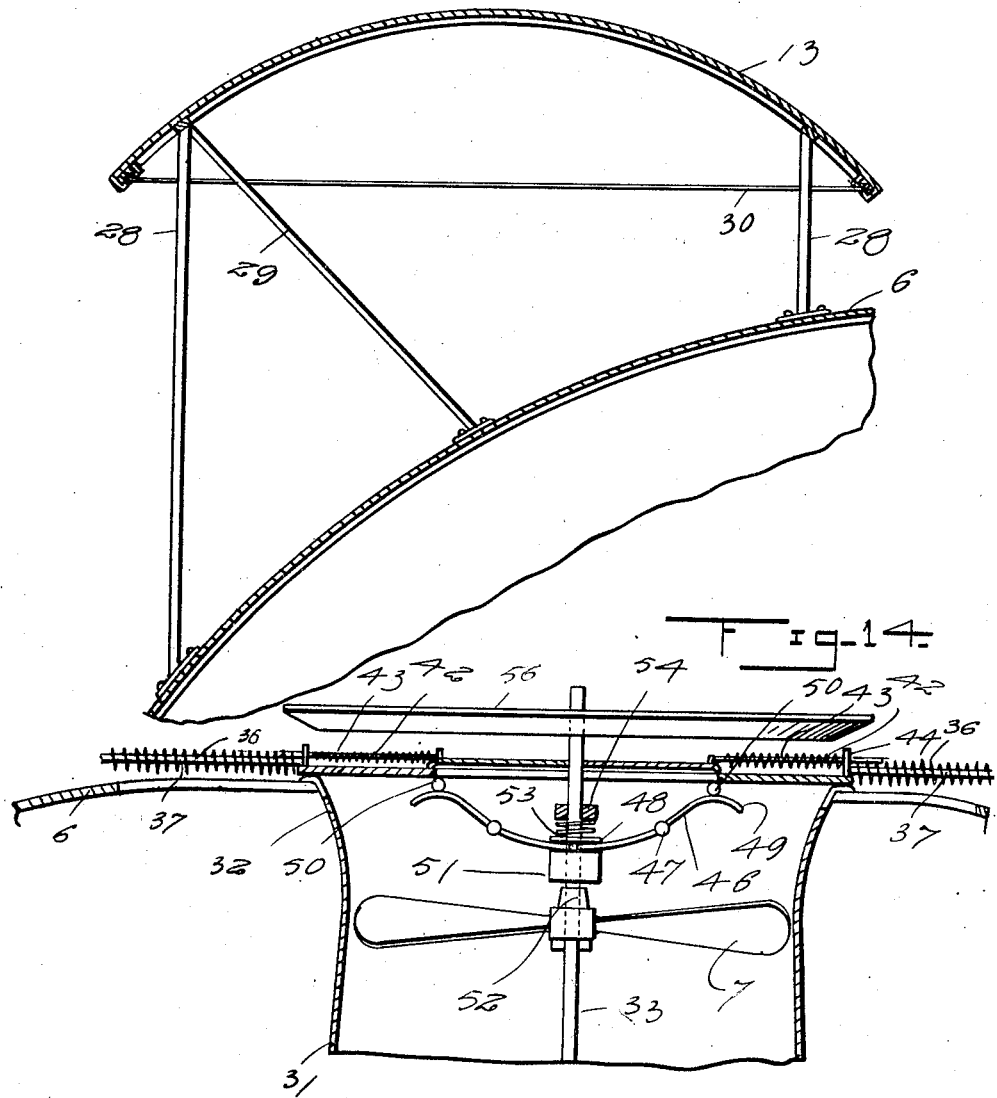

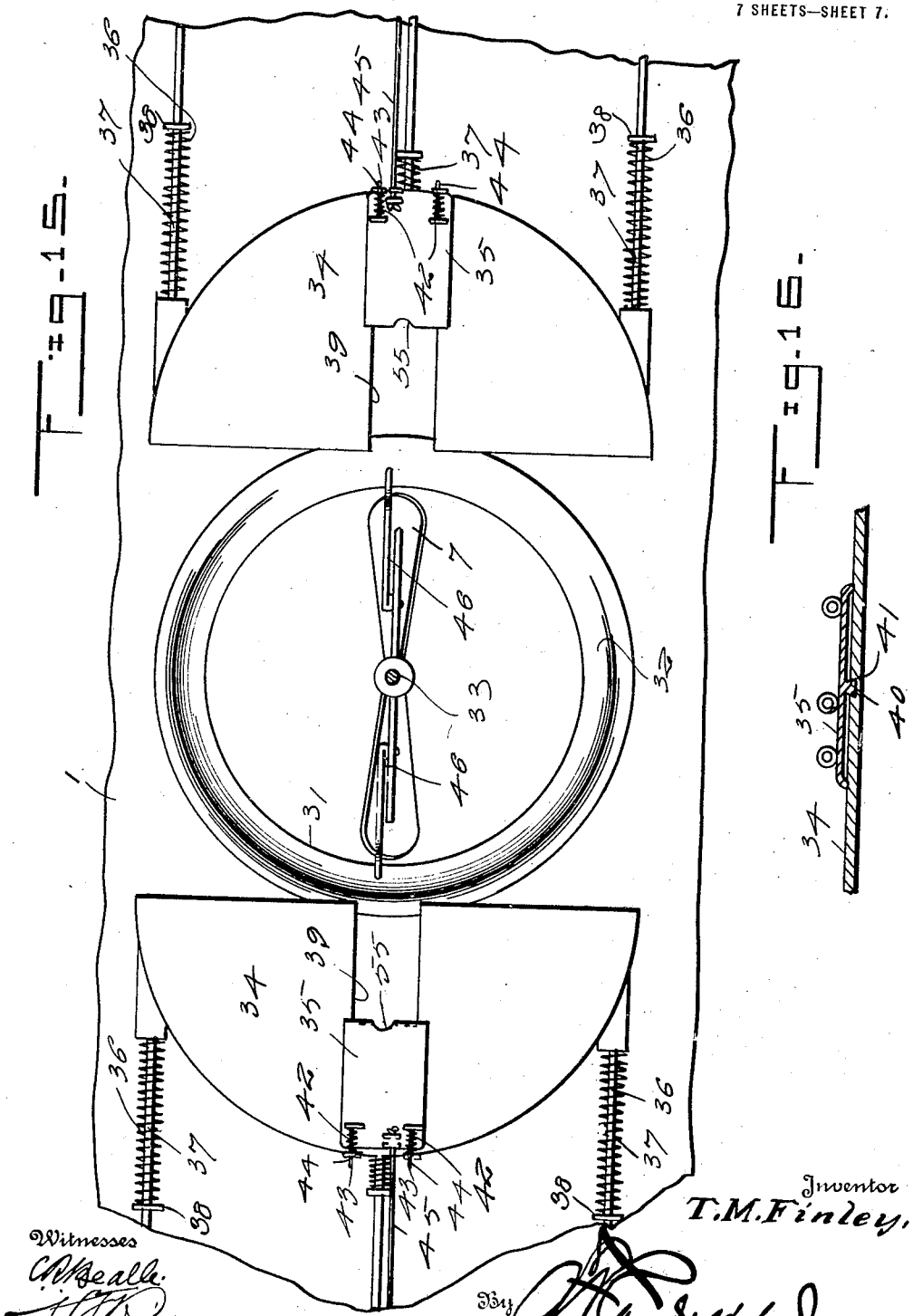

UNITED STATES PATENT OFFICE.

THOMAS M. FINLEY, OF ORAN, MISSOURI.

AEROCRUISER.

1,328,040. Specification of Letters Patent. Patented Jan. 13, 1920.

Application filed June 29, 1917. Serial No. 177,816.

*To all whom it may concern:*

Be it known that I, THOMAS MILTON FINLEY, a citizen of the United States, residing at Oran, in the county of Scott and State of Missouri, have invented certain new and useful Improvements in Aerocruisers; and I do hereby declare the following to be a full, clear, and exact description of the invention, such as will enable others skilled in the art to which it appertains to make and use the same.

The invention relates to improvements in airships.

The object of the present invention is to improve the construction of airships, more especially that shown and described in Patent 1,265,638, granted to me May 7, 1918, and in Patent No. 1,233,210, granted to me July 10, 1917, and to increase the simplicity, efficiency and practicability of the airship or areocruiser and to enable the weight carried by the same to be arranged below the body of the areocruiser to increase the stability of the machine and effectually prevent any tendency of the machine to rotate on a longitudinal axis.

It is also an object of the invention to improve the construction of the means for controlling the ascent and descent of the aerocruiser and to locate the engine rooms exteriorly of and in close proximity to the gas bags or compartments so that the desired temperature may be maintained in the same without material loss in either the heating means or the means for reducing the temperature when such devices are employed.

It is also an object of the invention to arrange the gyratory planes so that they will not interfere with either the driving means or the means for elevating the cruiser or causing the descent of the same.

Another object of the invention is to improve the construction of the current supporting planes and to enable the lifting propellers to be employed for packing the air in the longitudinal trough so as to increase the density of the air in the trough, both for the purpose of increasing the effect of the driving propellers and for rendering the aerocruiser more buoyant and more easily propelled.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings:

Figure 1 is a plan view of an aerocruiser constructed in accordance with this invention.

Fig. 2 is a side elevation of the same.

Fig. 3 is a central longitudinal sectional view of the aerocruiser, the walls of the vertical openings or passages being shown in elevation.

Fig. 4 is a transverse sectional view of the aerocruiser taken substantially on the line 4—4 of Fig. 3.

Fig. 5 is a similar view taken on the line 5—5 of Fig. 3.

Fig. 6 is an enlarged detail horizontal sectional view, illustrating the arrangement of the adjustable elevating planes.

Fig. 7 is a detail sectional view taken substantially on the line 7—7 of Fig. 6.

Fig. 8 is a similar view on the line 8—8 of Fig. 6.

Fig. 9 is a detail view illustrating the means for adjusting the side elevating planes.

Fig. 10 is a detail view of the sprocket gearings for rotating the driving propellers.

Fig. 11 is a detail horizontal sectional view on the line 11—11 of Fig. 3, illustrating the construction of the casing or well for the vertical ladder.

Fig. 12 is a detail view illustrating the tapered form of the front end of the front car.

Fig. 13 is an enlarged detail sectional view illustrating the construction of the side longitudinal planes.

Fig. 14 is an enlarged sectional view illustrating the construction of the lifting propellers, the gyratory stabilizing member and the closures for controlling the action of the lifting propellers.

Fig. 15 is an enlarged plan view of one of the lifting propellers, the closures being open.

Fig. 16 is a detail sectional view illustrating the construction of the auxiliary slidable doors or closures.

Like numerals of reference designate corresponding parts in the several figures of the drawings.

In the accompanying drawings, in which is illustrated the preferred embodiment of the invention, the aerocruiser comprises in its construction a buoyant body 1 of substantially crescent configuration in cross section with the bottom portion modified somewhat from the configuration disclosed in the aforesaid applications, the trough 2 being somewhat shallower and of a depth to receive substantially one-half of the driving propellers 3. The side portions 4 of the bottom of the body curve downwardly and outwardly and merge at their inner portions into the sides of the trough 2, and their outer portions 5 are curved upwardly and merge into the arched approximately semi-cylindrical top 6. Owing to the particular construction of the bottom of the body, the latter does not present any sharp angles. It also operates as an aeroplane and as a parachute in causing the air to pack beneath it. This will increase the density of the air beneath the body and will materially assist the aerocruiser both in traveling through the air and in hovering and descending and the tendency of the body is to produce a cushion of air beneath it. This construction also enables the machine to respond quickly to the controlling means and will enable the machine to descend gradually and gently so that there will be no jar and little vibration incident to the landing of the aerocruiser. The tendency of the body is to compress or condense the air to cause the same to rush into the trough and also to enable rotary horizontally disposed lifting propellers 7 to operate in a sufficiently dense medium to obtain a maximum lifting effect, and also to enable the said horizontal lifting propellers to operate on air of such density to force the same downwardly through vertical openings 8 into the trough 2 to maintain the air in the trough at a uniform maximum density and to counteract the effect of air pockets and similar unfavorable atmospheric conditions.

With the exception of the aforesaid construction of the bottom and the trough, the body 1 is of substantially the same shape as that illustrated in Patent No. 1,265,638, granted to me May 7, 1918. The body has its terminal portions comprising tapered top sections 10 and lower transversely curved tapered portions 11 which are rounded at the corners as at 12. The top sections 10 form horizontal wedges adapted to divide the air and cause the same to travel along the side of the upper portion of the body and pass beneath side supporting planes 13. In this manner, the air displaced by the body is directed to the side supporting planes and to the underside of the body through the longitudinal trough thereof, causing the displaced air to assist in sustaining the body and to increase the density of the air around the body, except at the top where, as hereinafter explained, the density of the air is lessened so that there is a natural tendency of the body to rise through the difference in density of the air at the top and bottom of the body.

The body of the machine is preferably formed of a suitable frame work 14 and a covering 15 of cloth arranged on the frame work. The frame work may be of any desired construction and arrangement of bracing bars or members to secure the requisite strength and the necessary lightness, and the said body is preferably divided into a plurality of separate gas bags or compartments by transverse partitions 16 which may be of any desired number to enable the buoyancy of the body to be varied at different portions thereof to compensate for any uneven distribution of a load. Also the cloth covering is designed to be supported and reinforced as explained in the aforesaid patents, and any suitable means may be employed for heating or cooling the gas contained within the body to vary the buoyancy of the latter so that the required buoyancy may be maintained without the usual ballast and the necessity of throwing out portions of the same when it is desired to lighten the aerocruiser. The halls or compartments for the mechanism and the operators and cargo of the aerocruiser are eliminated from the body, and front, rear and intermediate cars 17, 18 and 19 are suspended from the body centrally thereof in spaced relation with the trough and at points adjacent to the side portions of the bottom of the body so as to be in close proximity thereto. This will enable the mechanism, for varying the temperature of the gas and the pressure of the same, to be located close to the body so that there will be little loss in such heat transfer. The front, rear and intermediate cars may be of any desired number and of any required size and they are connected with the frame work of the body by suitable plane members 20, and the front car 17 has a tapered front portion 21 to enable it to split the air and eliminate as much as possible the resistance of the car to the forward movement of the aerocruiser. The cars are connected by suitable platforms or bridges 22 (see Fig. 2) to enable the crew to readily pass from one car to another, and these bridges or connecting portions may be of any desired construction. The cars are also connected at the bottom by longitudinal beams or rods 23 which are arranged in pairs and to which are connected springs 24 of axles 25 of front and rear wheels, but the wheels may of course be mounted in any other desired manner.

The side supporting planes 13, which are located at opposite sides of the upper portion of the body, are curved or arcuate in cross section and present upper convex surfaces and lower concave surfaces so as to form supporting planes and at the same time reduce to a minimum the resistance of the planes to the upward movement of the body, and the said planes are arranged in spaced relation with the top of the body to provide intervening spaces 27 between the inner longitudinal edges of the supporting planes 13 and the body, so that when the body is ascending the air may escape and pass downwardly between the said side planes 13 and the body. The supporting planes, which are located above the portions of the top 6 on which they are mounted, are connected with the frame work of the body by vertical and inclined members 28 and 29 and are provided with horizontal braces or tie rods 30, but the connecting and bracing means may of course be varied as will be readily understood.

The openings 8, which may be of any desired number and which extend upwardly from the trough to the center of the approximately semi-cylindrical top, are tapered upwardly and have tubular walls 31 which are flared at their upper ends at 32 adjacent to the top of the body so that the air will enter the upper ends of the vertical openings from the top and sides so that the propellers 7, which are located within the upper portions of the openings 8, will have the same effect as operating in the open air and at the same time be arranged in the body so as to prevent them from offering resistance to the forward movement of the body. The propeller 7, which is of the ordinary construction, is mounted on a vertical shaft 33 and it is adapted to force the air downwardly through the vertical opening for the purpose of lifting the aerocruiser and also for the purpose of increasing the density of the air in the trough beneath the body. By the arrangement of the vertical openings at the central portion of the body at spaced points along the same, the air will be taken from above the body and packed below the same, thereby reducing the density of the air at the top of the body and lessening the resistance of the air to the upward movement of the body and causing the air packed beneath the body to tend to lift and support the body.

The effect of the lifting propellers is controlled by main and auxiliary slidable doors or closures 34 and 35 located at the top of the body and adapted to expose the upper ends of the vertical openings 8 and the propellers to a greater or less degree as required. The main doors of closures 34, which are substantially semi-circular, are slidably mounted and are movable inwardly and outwardly in a direction longitudinally of the body and they are urged inwardly by coiled springs 36 disposed on rods 37 and interposed between the slidable doors or closures 34 and guides 38. The main doors 34 are provided with central openings 39 and the auxiliary doors are slidable to cover and uncover the openings 39 which are adapted to admit air to the central portion of the opening 8 prior to the opening of the main doors 34, so that the air will not be delivered to the propeller in a thin streak. The auxiliary door 35 is slidably mounted upon the main door 34 by any suitable means, a dove-tailed rib 40 being shown in Fig. 16 and being arranged to operate in a dove-tailed groove or way 41. Any suitable anti-friction devices may be employed to assist the movements of the slidable doors or closures, and the auxiliary door or closure 35 is urged to its closed position by springs 42 preferably disposed on rods 43 operating in guides 44 of the main door, but any other suitable means may be employed for mounting the springs 42 which are of less strength than the springs 36 so that operating connections 45 connected with the auxiliary doors will open the same to the full extent of the movement of the said auxiliary doors independently of the main doors, before moving the main doors 34. This operation is due to the superior strength of the springs 36 which will maintain the main doors in their closed position until the auxiliary doors have reached the limit of their outward movement. Also in the closing movement of the doors, the main doors will completely close prior to the closing of the auxiliary doors and the operating devices for controlling the doors or closures 34 and 35 are designed to be located in the cars, and may be of any preferred form.

When the main doors close, the propeller is automatically stopped to prevent it from churning the air in the opening 8 and this operation is effected by means of opposite levers 46 fulcrumed at an intermediate point at 47 and having inner forked portions 48 and outer curved portions 49 presenting upper convex faces and arranged in the path of rollers 50 forming projections and adapted to engage the curved arms or portions 49 of the levers and depress the said arms and thereby lift the inner forked arms and raise a slidable or movable clutch section or member 51 out of engagement with a relatively fixed clutch section or member 52 carried by the propeller. The slidable clutch section 51 is interlocked with the vertical shaft 33 and the propeller, which is loose on the shaft, is clutched to the same when the section 51 is moved into engagement with the section 52. The slidable clutch section 51, which is adapted to move downwardly by gravity, is positively urged into engagement with the clutch section 52 by means of a coiled spring 53 disposed on the shaft 33 and interposed between the slidable clutch section 52 and a stop 54 which may consist of a collar or other suitable device. The main doors have their straight edges meeting at opposite sides of the vertical shaft and the auxiliary doors 35 are provided with recesses 55 forming an opening through which the shaft passes when the doors are closed. The vertical propeller shaft is extended above the top of the body and carries a rotary gyratory member or plane 56, which is shown in the drawings as consisting of an annulus or rim supported by spokes 56a extending from a hub 57a. The annular plane has a central opening of substantially the diameter of the upper end of the opening or passage 8 so as to not interfere with the passage of the air to and from the same, or interfere with the action of the horizontal lifting propeller. The annular plane extends upwardy and outwardy. The vertical propeller shaft may be braced from the frame work of the machine in any desired manner.

Each of the cars is equipped on each side with laterally extending stabilizing or elevating planes 57 mounted on horizontal shafts 58 and constructed of any suitable material. The laterally extending elevating planes, which are centrally connected with the said shafts 58, have their forwardly extending portions 59 curved upwardly and presenting an upper convex surface and a lower concave surface, and the rearwardly extending portion 60 is reversely curved and presents a concave upper face and a convex lower face, the said planes being approximately sigmoidal in cross section. The transverse shafts or pivots 58 are journaled in suitable bearings and each of the planes 57 is provided with a curved rack 61 preferably carried by a curved brace 62 and having teeth at its upper concave edge to mesh with a pinion 63 mounted on a horizontal shaft 64. The shaft 64 of each plane 57 extends through the side of the car and is provided at its inner end with an operating arm or lever 65 having a dog or detent 66 controlled by a latch lever 67 and arranged to engage a toothed segment 68 by means of which the elevating plane is secured in its adjustment. The curved rack and pinion are located exteriorly of the car and the curved brace or member 62 is disposed transversely of the elevating plane 57, but it may be arranged in any other desired manner, as will be readily understood, and various other means may be employed for adjusting the elevating plane and for securing the same in its adjustment. The operating arms or levers are shown depending at the sides of the car and they are adapted to be readily operated and the rack and pinion operating mechanism will afford sufficient leverage to enable the planes to be easily controlled for elevating the aerocruiser, trimming or balancing the same and for causing the cruiser to descend.

The engines 69 are preferably cushioned by springs 70 for absorbing the shocks and jars and preventing the same from being transmitted to the car or the body of the machine and the engines are supplied with gasolene or other fuel from main longitudinally disposed tanks 71 connected by pipes 72 with auxiliary tanks 73 located above the engines and connected with the latter by flexible feed pipes 74 which are adapted to permit relative movement of the engines in the cushioning action of the springs 70. Any suitable means may be employed for transmitting motion from the engines to the propellers and any number of propellers and engines may of course be employed. In the accompanying drawings, the engines have horizontal shafts 75 which are connected by sprocket gearings 76 with horizontal propeller shafts 77 of the propellers 3 and they are connected by sprocket gearing 78 with longitudinal shafts 79 extending in advance and in rear of the cars and connected by bevel-gearing 80 with the vertical shafts of the horizontal lifting propellers. In practice the engines will be arranged in pairs so that they may be operated alternately and also for providing an engine ready for instant use in event of an accident to the engine in operation. Also a double arrangement of this character of engines will provide for increased power in event of the same being required in an emergency.

The horizontal shafts 77 are mounted in suitable hangers and may be braced in any desired manner, and the vertical shafts of the lifting propellers can be conveniently supported adjacent to their lower ends by the bridges or gangways connecting the cars. Also, in the present construction of the body, the main gasolene tanks or fuel tanks which extend longitudinally of the body are designed to constitute portions of the frame work of the same so that the tanks may be utilized in providing a frame work of the required strength and rigidity.

The aerocruiser may be equipped with one or more vertical ladders 81 to enable the occupants of the cars to reach the top of the body. The ladder 81 is arranged within a casing 82 which is preferably rectangular in horizontal section between the bottom of the body and the top thereof and which has a tapered lower front portion 83 between the bottom of the body and the top of the car to enable the casing to split the air and to prevent the said casing from offering material resistance to the forward movement of the machine. The body is designed to be provided at the top with gun emplacements 84 and the cars may also be equipped with any devices for either offense or defense.

What is claimed is:

1. An airship of the class described including a body provided at the bottom with a longitudinal trough, and having vertical openings extending through the body and arranged at intervals and terminating at their lower ends at the trough, propellers operating in the trough, cars located between the vertical openings and suspended from the body, lifting propellers operating in the said vertical openings, means carried by the cars for actuating the propellers, and gearing for connecting the propellers with the actuating means.

2. An airship of the class described including a body having a longitudinal trough at the bottom and provided at intervals with openings extending through the body from the trough to the top thereof, cars suspended from the body and located between the said openings, driving propellers located between the cars and the body and operating at the said longitudinal trough, horizontal shafts carrying the engines mounted in the cars, and gearing connecting the engines with the horizontal shafts of the said propellers.

3. An airship of the class described including a body having a longitudinal trough at the bottom and provided at intervals with openings extending through the body from the trough to the top thereof, cars suspended from the body and located between the said openings, driving propellers located between the cars and the body and operating in the said longitudinal trough, horizontal propellers operating in the vertical openings and having vertical shafts, engines mounted in the cars, and gearing connecting the engines with the vertical and horizontal shafts for operating the said propellers.

4. An airship of the class described including a body having a longitudinal trough at the bottom and provided at intervals with openings extending through the body from the trough to the top thereof, cars suspended from the body and located between the said openings, driving propellers located between the cars and the body and operating in the said longitudinal trough, horizontal propellers operating in the vertical openings and having vertical shafts, engines mounted in the cars, gearing connecting the engines with the vertical and horizontal shafts for operating the said propellers, and bridges connecting the cars and supporting the lower portions of the vertical shafts.

5. An airship of the class described including an approximately segmental body having a central longitudinal trough at the bottom, a car suspended from the body below the trough and longitudinal supporting side planes located at the upper portion of the body at opposite sides of the same, said side planes being curved in cross section and presenting upper convex surfaces and lower concave surfaces.

6. An airship of the class described including a body provided at the bottom with a longitudinal trough, a car suspended from the body below the trough, laterally extending elevating planes carried by the car and located at the bottom of the body, and means for adjusting the elevating planes independently of each other, said means including curved racks located at the inner ends of the said planes, shafts extending through the sides of the car and provided with interiorly arranged operating means, and pinions mounted on the shafts exteriorly of the car and meshing with the said racks.

7. An airship of the class described including a body provided at the bottom with a longitudinal trough, a car suspended from the body below the trough, and a vertical casing extending from the car through the body to the top thereof, said vertical casing being provided at the space between the car and the body with a tapered portion and having interiorly arranged means for assending and descending from the car to the top of the body.

8. An airship of the class described including a body provided at the bottom with a longitudinal trough, a car suspended from the body below the trough, main tanks extending longitudinally of the body at opposite sides of the trough, an auxiliary tank located within the car, and pipes extending from the car and connecting the auxiliary tank with the main tanks.

9. An airship of the class described including a body comprising a frame work and a covering, said body being provided at the bottom with a trough, a car suspended from the body below the trough, main fuel tanks extending longitudinally of the body at opposite sides of the trough and constituting portions of the frame work, an auxiliary tank mounted within the car, and pipes connecting the auxiliary tank with the main fuel tanks.

10. An airship of the class described including a body having a longitudinal trough at the bottom and provided with openings extending upwardly from the bottom to the top of the body and connected at their lower ends with the trough, cars suspended from the body between the said openings, driving propellers operating in the space between the cars and the body and hung from the latter between the openings of the same, and means for actuating the propellers.

11. An airship of the class described including a body approximately segmental in cross section and provided at the bottom with a longitudinal trough, a car suspended from the body and located below the trough in spaced relation with the said body, propellers operating in the trough, and a plurality of rotary gyratory members located above the center of the body and arranged at intervals along the same.

12. An airship of the class described including a body approximately segmental in cross section and provided at the bottom with a longitudinal trough, a car suspended from the body and located below the trough in spaced relation with the said body, propellers operating in the trough, a plurality of rotary gyratory members located above the center of the body and arranged at intervals along the same, and laterally extending planes carried by the car and adjustable to elevate and depress the machine.

13. An airship of the class described including a body substantially segmental in cross section and hollowed out at the bottom to provide a trough formation longitudinally of the body, a car suspended from the body at the bottom thereof, propellers operating between the car and the body, and laterally extending elevating planes carried by the car and also located within the hollowed out portion of the body.

14. An airship of the class described including a body substantially segmental in cross section and hollowed out at the bottom to provide a trough formation longitudinally of the body, a car suspended from the body at the bottom thereof, propellers operating between the car and the body, laterally extending elevating planes carried by the car and also located within the hollowed out portion of the body, and a series of rotary gyratory members mounted on the body at the top thereof and arranged at intervals.

In testimony whereof I affix my signature in presence of two witnesses.

THOMAS M. FINLEY.

Witnesses:
  M. I. LEWIS,
  BENNETT S. JONES.